United States Patent
Minick

(10) Patent No.: US 9,149,870 B2
(45) Date of Patent: Oct. 6, 2015

(54) ADDITIVE MANUFACTURING CHAMBER WITH REDUCED LOAD

(75) Inventor: Alan B. Minick, Madison, AL (US)

(73) Assignee: AEROJET ROCKETDYNE OF DE, INC., Canoga Park, CA (US)

( * ) Notice: Subject to any disclaimer, the term of this patent is extended or adjusted under 35 U.S.C. 154(b) by 488 days.

(21) Appl. No.: 13/617,775

(22) Filed: Sep. 14, 2012

(65) Prior Publication Data

US 2014/0077421 A1    Mar. 20, 2014

(51) Int. Cl.
B22F 3/105     (2006.01)
B29C 67/00     (2006.01)

(52) U.S. Cl.
CPC ........... *B22F 3/1055* (2013.01); *B29C 67/0085* (2013.01); *B22F 2003/1056* (2013.01); *B29C 67/0077* (2013.01)

(58) Field of Classification Search
CPC ........... B22F 31/055; B22F 2003/1056; B29C 67/0085; B29C 67/0077
See application file for complete search history.

(56) References Cited

U.S. PATENT DOCUMENTS

| | | | |
|---|---|---|---|
| 6,269,540 B1 | 8/2001 | Islam et al. | |
| 6,405,095 B1 * | 6/2002 | Jang et al. | 700/118 |
| 7,777,155 B2 | 8/2010 | Twelves, Jr. et al. | |
| 7,810,237 B2 | 10/2010 | Lange et al. | |
| 2004/0025905 A1 * | 2/2004 | Ederer et al. | 134/6 |
| 2004/0056022 A1 | 3/2004 | Meiners et al. | |
| 2008/0001331 A1 * | 1/2008 | Ederer | 264/460 |
| 2011/0061591 A1 * | 3/2011 | Stecker | 118/663 |
| 2011/0089610 A1 * | 4/2011 | El-Siblani et al. | 264/401 |
| 2011/0101490 A1 | 5/2011 | Gulari | |
| 2011/0106290 A1 * | 5/2011 | Hovel et al. | 700/120 |
| 2011/0252618 A1 | 10/2011 | Diekmann et al. | |

* cited by examiner

*Primary Examiner* — Geoffrey S Evans
(74) *Attorney, Agent, or Firm* — Joel G Landau

(57) ABSTRACT

A disclosed additive manufacturing machine includes a fixed platform defining a work surface for supporting fabrication of a part and a housing defining a chamber over the work surface. A material applicator is supported on the housing for depositing material onto the work surface. An energy directing device is also supported on the housing and directs energy within the chamber to form a part. The housing is movable relative to the work surface therefore moves the energy producing device relative to the work surface to maintain a distance between the energy directing device and a surface of the part during fabrication.

15 Claims, 3 Drawing Sheets

ADDITIVE MANUFACTURING CHAMBER WITH REDUCED LOAD

BACKGROUND

This disclosure generally relates to an additive manufacturing machine and process. More particularly, this disclosure relates to a configuration compensating for increased size and weight of larger parts generated in an additive manufacturing process.

Typical manufacturing methods include various methods of removing material from a starting blank of material to form a desired completed part shape. Such methods utilize cutting tools to remove material to form holes, surfaces, overall shapes and more by subtracting material from the starting material. Such subtractive manufacturing methods impart physical limits on the final shape of a completed part. Additive manufacturing methods form desired part shapes by adding one layer at a time and therefore provide for the formation of part shapes and geometries that would not be feasible in part constructed utilizing traditional subtractive manufacturing methods.

Additive manufacturing utilizes an energy source such as a laser beam to melt layers of powdered metal to form the desired part configuration layer upon layer. The laser forms a melt pool in the powdered metal that solidifies. The works surface and part are then moved downward and another layer of powdered material is then spread over the formerly solidified part and melted to the previous layer to build a desired part geometry layer upon layer. Powdered material that is applied but not melted to become a portion of the part accumulates around and within the part. For smaller parts the excess powdered material is not significant. However, as capabilities improve and larger parts are fabricated, the excess powdered metal becomes a significant consideration in both part fabrication capabilities and economic feasibility.

SUMMARY

An additive manufacturing process according to an exemplary embodiment of this disclosure includes defining a fixed work surface and housing at least partially surrounding the fixed work surface, depositing material within the housing, directing energy on portions of the deposited material according to a defined part geometry, and moving the housing vertically relative to the fixed work surface by a single powder layer thickness to maintain a vertical spacing between the housing and the part during fabrication.

In a further embodiment of the foregoing additive manufacturing process, includes retaining deposited material on the work surface about a periphery of the part during fabrication.

In a further embodiment of any of the foregoing additive manufacturing processes, includes the energy producing device supported by the housing moving relative to the work surface.

In a further embodiment of any of the foregoing additive manufacturing processes, includes supporting a material depositing device on the housing and moving the material depositing device with the housing.

In a further embodiment of any of the foregoing additive manufacturing processes, includes moving the housing with at least one actuator attached to a platform and fixed relative to the work surface.

In a further embodiment of any of the foregoing additive manufacturing processes, includes moving the housing incrementally a distance substantially equal to a thickness of at least one layer of deposited material.

In a further embodiment of any of the foregoing additive manufacturing processes, includes moving the housing a distance determined to maintain a desired focal length between the energy directing device and a surface of the part during fabrication.

An additive manufacturing machine according to an exemplary embodiment of this disclosure includes a fixed platform defining a work surface for supporting fabrication of a desired part geometry, a housing defining a chamber at least partially defined by the work surface; a material applicator supported on the housing for depositing material onto the work surface, and an energy directing device supported on the housing and directing energy within the chamber according to a desired part geometry. The housing is movable relative to the work surface to maintain a distance between the energy directing device and a surface of the part during fabrication.

In a further embodiment of the foregoing additive manufacturing machine, includes an actuator for moving the housing relative to the work surface.

In a further embodiment of any of the foregoing additive manufacturing machines, includes a controller governing movement of the housing relative to the work surface.

In a further embodiment of any of the foregoing additive manufacturing machines, the controller maintains the distance between the energy producing device and a surface of the part by moving the housing relative to the work surface a distance corresponding with a thickness of a layer of deposited material.

In a further embodiment of any of the foregoing additive manufacturing machines, material deposited on the work surface is maintained about the part during fabrication.

In a further embodiment of any of the foregoing additive manufacturing machines, the housing includes walls supporting a top and the energy directing device is supported on the top.

In a further embodiment of any of the foregoing additive manufacturing machines, the material applicator is mounted to at least one of the walls.

In a further embodiment of any of the foregoing additive manufacturing machines, the material applicator is movable across the work surface for depositing material.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
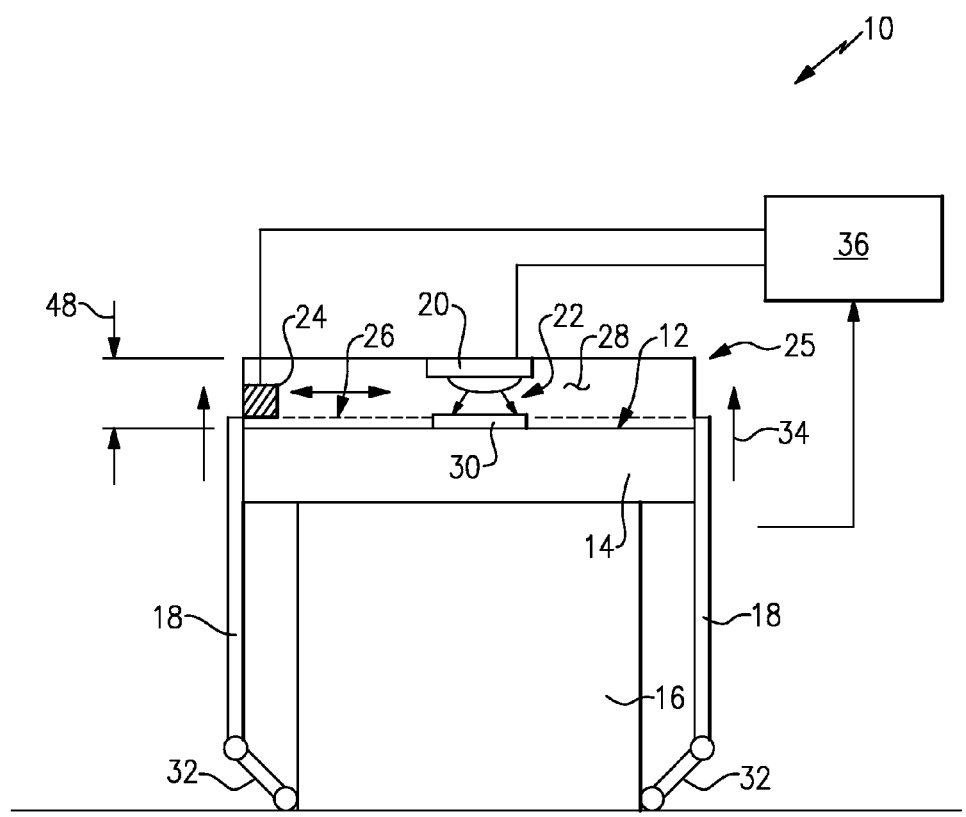
FIG. 1 is schematic view of an example additive manufacturing machine in an initial position.

Referring to FIG. 1, an additive manufacturing machine 10 includes a housing 25 that defines a chamber 28 and an energy transmitting device 20 for directing an energy beam 22 on or above a work surface 12 on which a part 30 is fabricated. In this example, the energy transmitting device 20 emits a laser beam 22 for melting material 26 deposited by a material applicator 24. The example material 26 is a metal powder that is applied in a layer over the work surface 12 and subsequently melted according to a specific, desired part configuration by the beam 22.

In this example, the beam 22 comprises a laser beam emitted by the energy transmitting device 20. However, other energy transmitting devices may be utilized to melt material in the desired configuration of the part 30. The beam 22 directs energy onto the metal powder 26 laid on the work surface 12 to melt subsequent layers to form the desired configuration 30.

The additive manufacturing process utilizes layers of material 26 applied upon the work surface 12 along with the beam 22 to melt subsequent layers, thereby forming the desired part configuration. A controller 36 governs operation of the energy transmitting device 20 along with the material applicator 24. The controller 36 guides the beam 22 to form the desired part configuration by focusing energy from the beam 22 on the layer of powdered material 26 over the part 30 to melt portions of the powdered metal material according to predefined part geometry. Subsequent cooling of the melted material solidifies the melted portions of the material 26 to the part 30 to grow the part from the surface 12 upward until complete.

Initially the material applicator 24 sweeps across the work surface 12 to disperse a layer of material 26 over the entire work surface 12. As appreciated, the portions of material 26 that are not part of the part geometry 30 are not melted but remain on the surface 12. With increasing size and capability, the amount of material that remains within the chamber 28 and not part of the fabricated part 30 can become significant.

In this example, the work surface 12 is part of a platform 14 mounted to a rigid base 16. The platform 14 and the base 16 are fixed. The housing 25 includes walls 18 that are engaged to actuators 32. The walls 18 and housing 25 are movable upward relative to the fixed base 14. Accordingly, the walls 18 and platform 14 define a chamber that is not of a fixed size but instead varies during part fabrication. The shape and number of walls 18 may vary as appropriate to the configuration of part 30.

FIG. 1 illustrates an initial position where the housing 25 disposes the energy source 20 at a height 48 above the work surface 12. The example part 30 includes a configuration that when completed is taller than the space provided within the chamber 28 at the initial position shown in FIG. 1.

In the initial process, the material applicator 24 sweeps across the work surface 12 and lays down a layer of material 26. The energy transmitting device 20 sweeps the laser beam 22 to melt material 26 according to the desired geometry of the part 30. Once the initial layer of the part 30 has been formed, the walls 18 are moved upwardly away from the work surface 12 by the actuators 32 as is dictated by the controller 36. The amount of movement relative to the number of sweeps of the applicator 24 is minimal as each layer represents a very small thickness of material that is applied over the part 30. Accordingly, the walls 18 are moved incrementally upward away from the work surface 12 to provide a controlled layering of powdered material 26 above part 30.

Figure 2:
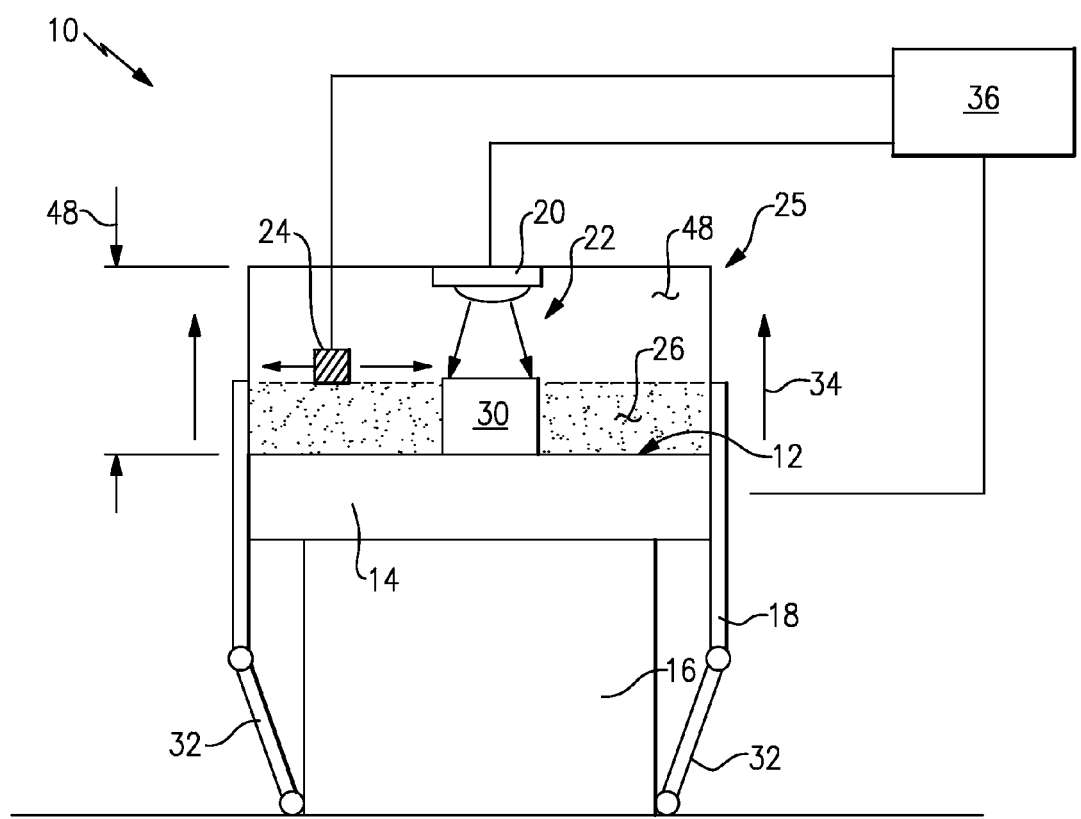
FIG. 2 is a schematic view of the example additive manufacturing machine in an intermediate position.

Referring to FIG. 2, the example additive manufacturing machine 10 shown in an intermediate position where the walls 18 had been moved upwardly 34 such that the height 48 has increased. Moreover, the amount of material 26 that is contained within the chamber 28 has increased. As the material applicator 24 sweeps across the work surface 12, material is distributed over the working surface 12 and the part 30. The energy producing device 20 melts material according to the proximate geometry of the part 30. The remaining excess powder simply remains on the work surface 12 and accumulates around the part.

The platform 14 is supported on a rigid base 16 and therefore does not move and maintains a desired position. The laser beam 20 is moved upwardly with the walls 18 and housing 25 and therefore also maintains a desired distance from the surface of the part 30. Movement of the walls 18 are governed by the controller 36 such that the layer of powdered material 26 deposited upon part 30 and over working surface 16 is controlled to the desired thickness. Beam 22 is swept across the part 30 to provide the required melting and solidification of powdered material 26.

As the part 30 grows in height, the walls 18 and housing 25 is moved upwardly such that the height within the chamber 28 grows in concert with the height of the part 30. Accordingly, layer of powdered material 26 deposited upon part 30 and over working surface 12 is controlled to the desired thickness. The beam 22 can remain focused on the powdered material 26 above the upper surface of the part 30 during manufacture of the part without moving the platform 14 or the base 16.

Figure 3:
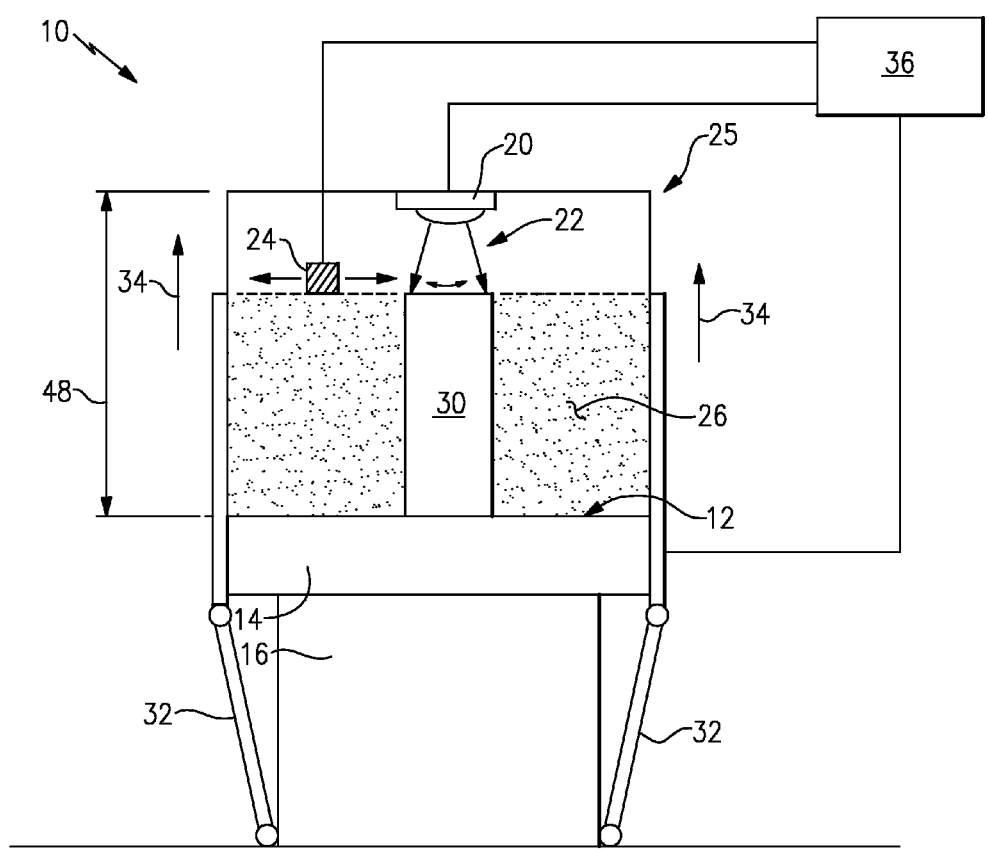
FIG. 3 is a schematic view of the example additive manufacturing machine in a final, fully extended position.

Referring to FIG. 3, the additive manufacturing machine 10 is shown in a position where the part 30 is substantially in completed form. In this position, the housing 25 are extended such that the part 30 has grown within the chamber 28. Moreover, the amount of material 26 surrounding the part 30 has increased such that the weight supported by the base 14 is substantial. However, because the platform 14 and base 16 are rigidly fixed, the weight of the material 26 does not substantially affect the fabrication process of the part 30 or the load on actuators 32. As appreciated, movement of the walls 18 and housing 25 relative to the part 30 maintains the desired powdered material 26 layer thickness upon the part 30. The mass of non-melted material 26 surrounding the part 30 does not affect nor does it cause movement or other disruptions of the process.

In operation, the example additive manufacturing machine 10 provides for the fabrication of a desired part beginning with an application of a layer of material 26 to the work surface 12. After each application of material 26 to the work surface 12, the energy beam 22 melts material to add an additional layer of to form the part 30.

After each layer the housing 18 will be incremented upward a distance determined to comply with the addition of a subsequent layer of material to the part 30. After application of each layer of material to the part 30, the unused material 26 surrounding the part 30 is simply maintained within the chamber 28. The walls 18 are incremented upward to increase the height 48 within the chamber 28 to both maintain the desired height relationship between the top of the walls 18 and the applicator 24 to the top of the part 30 while also compensating and providing additional space for the part 30 if required.

Accordingly, the example manufacturing machine 10 and process provides for the fabrication of larger parts within increased mass of both the part and excess material surrounding the part without the additional cost, expense, and control required to handle the increased weight and mass.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An additive manufacturing process comprising:
defining a fixed work surface and housing defining a chamber surrounding the fixed work surface;
depositing material within the housing defining the chamber;
directing energy on portions of the deposited material according to a defined part geometry;
and moving the housing defining the chamber vertically relative to the fixed work surface by a single powder layer thickness to maintain a vertical spacing between the housing defining the chamber and the part during fabrication.

2. The additive manufacturing process as recited in claim 1, including retaining deposited material on the work surface about a periphery of the part during fabrication.

3. The additive manufacturing process as recited in claim 1, including the energy producing device supported by the housing defining the chamber moving relative to the work surface.

4. The additive manufacturing process as recited in claim 1, including supporting a material depositing device on the housing defining the chamber and moving the material depositing device with the housing.

5. The additive manufacturing process as recited in claim 1, including moving the housing defining the chamber with at least one actuator attached to a platform and fixed relative to the work surface.

6. The additive manufacturing process as recited in claim 1, including moving the housing defining the chamber incrementally a distance substantially equal to a thickness of at least one layer of deposited material.

7. The additive manufacturing process as recited in claim 1, including moving the housing defining the chamber a distance determined to maintain a desired focal length between the energy directing device and a surface of the part during fabrication.

8. An additive manufacturing machine comprising:
a fixed platform defining a work surface for supporting fabrication of a desired part geometry;
a housing defining a chamber at least partially defined by the work surface;
a material applicator supported on the housing for depositing material onto the work surface;
an energy directing device supported on the housing and directing energy within the chamber according to a desired part geometry, wherein the housing is movable relative to the work surface to maintain a distance between the energy directing device and a surface of the part during fabrication.

9. The additive manufacturing machine as recited in claim 8, including an actuator for moving the housing relative to the work surface.

10. The additive manufacturing machine as recited in claim 8, wherein material deposited on the work surface is maintained about the part during fabrication.

11. The additive manufacturing machine as recited in claim 8, including a controller governing movement of the housing relative to the work surface.

12. The additive manufacturing machine as recited in claim 11, wherein the controller maintains the distance between the energy producing device and a surface of the part by moving the housing relative to the work surface a distance corresponding with a thickness of a layer of deposited material.

13. The additive manufacturing machine as recited in claim 8, wherein the housing includes walls supporting a top and the energy directing device is supported on the top.

14. The additive manufacturing machine as recited in claim 13, wherein the material applicator is mounted to at least one of the walls.

15. The additive manufacturing machine as recited in claim 14, wherein the material applicator is movable across the work surface for depositing material.

* * * * *